United States Patent
Park et al.

(10) Patent No.: US 7,310,481 B2
(45) Date of Patent: Dec. 18, 2007

(54) WDM-PON HAVING BUS STRUCTURE

(75) Inventors: Sung-Bum Park, Suwon-si (KR); Seong-Taek Hwang, Pyeongtaek-si (KR); In-Kwon Kang, Seoul (KR)

(73) Assignee: Samsung Electronics Co., Ltd., Mae Tan-Dong, Yeongtong-Gu, Suwon-Si, Gyeonggi-Do, Korea (KR)

( * ) Notice: Subject to any disclaimer, the term of this patent is extended or adjusted under 35 U.S.C. 154(b) by 590 days.

(21) Appl. No.: 10/854,348

(22) Filed: May 26, 2004

(65) Prior Publication Data
US 2005/0117903 A1    Jun. 2, 2005

(30) Foreign Application Priority Data
Nov. 27, 2003  (KR)  ............... 10-2003-0084846

(51) Int. Cl.
*H04J 14/00*  (2006.01)
(52) U.S. Cl. .................... 398/72; 398/71; 398/70
(58) Field of Classification Search ........... 398/72, 398/71, 70, 66, 67, 68, 59
See application file for complete search history.

(56) References Cited
U.S. PATENT DOCUMENTS
7,155,127 B2 * 12/2006 Akimoto et al. ............. 398/72
2001/0048799 A1 * 12/2001 King et al. ................. 385/125

* cited by examiner

Primary Examiner—M. R. Sedighian
(74) Attorney, Agent, or Firm—Cha & Reiter, LLC

(57) ABSTRACT

Disclosure is a wavelength division multiplexed-passive optical network having a bus structure capable of connecting one central office to a plurality of remote nodes through one optical fiber. The wavelength division multiplexed-passive optical network (WDM-PON) having a bus structure includes a central office for downwardly transferring downstream optical signals having different wavelengths through a feeder fiber and for receiving upstream optical signals upwardly transferred through the feeder fiber; a plurality of remote nodes including at least a first remote node connected to the central office through the feeder fiber and a second remote node connected to the first remote node through the feeder fiber, dropping optical signals having corresponding wavelengths from among downwardly-transferred optical signals from the central office to at least one subscriber unit connected to each of the remote nodes, and adding the upstream optical signals, which are upwardly transferred from each subscriber unit, so as to upwardly transfer the upstream optical signals to the central office; and at least one subscriber unit for receiving the optical signals having the corresponding wavelengths dropped from each of the remote nodes and for upwardly transferring the upstream optical signals having different wavelengths through each of the remote nodes.

6 Claims, 3 Drawing Sheets

WDM-PON HAVING BUS STRUCTURE

CLAIM OF PRIORITY

This application claims priority to an application entitled "WDM-PON having bus structure," filed in the Korean Intellectual Property Office on Nov. 27, 2003 and assigned Serial No. 2003-84846, the contents of which are hereby incorporated by reference.

BACKGROUND OF THE INVENTION

1. Field of the Invention

The present invention relates to a wavelength division multiplexed-passive optical network, and more particularly to a wavelength division multiplexed-passive optical network having a bus structure capable of connecting one central office to a plurality of remote nodes via a single optical fiber.

2. Description of the Related Art

In general, a wavelength division multiplexed-passive optical network (WDM-PON) provides specific wavelengths to subscribers in order to ensure communication security and enhance communication services required by the subscribers. In addition, the WDM-PON can easily adapt new subscribers by simply increasing the number of dedicated wavelengths dedicated to the new subscribers.

Referring to FIG. 1, a conventional WDM-PON 100 has a star structure including a central office (CO) 10 connected to a remote node (RN) 20 through a feeder fiber 1 and the remote node 20 connected to a plurality of subscriber units 30 through distribution fibers by using a multiplexer/demultiplexer 21. In this regard, the multiplexer/demultiplexer 21 mainly uses an array waveguide grating (AWG) for the subscriber units.

As shown in FIG. 1, downstream signals multiplexed by a multiplexer/demultiplexer 11 of the central office are transferred to the remote node 20 through the feeder fiber 1 and demultiplexed by the multiplexer/demultiplexer 21 positioned at the remote node 20. Then, the downstream signals are transferred to each of subscriber units 31 and 32 through corresponding distribution fibers 2. Upstream signals outputted from the subscriber units 31 and 32 are transferred to the remote node 20. The upstream signals of subscribers, which are inputted to the multiplexer/demultiplexer 21 positioned at the remote node 20, are multiplexed so as to be transferred to the central office 10.

The conventional WDM-PON 100 mainly employs an expensive array waveguide grating as the multiplexer/demultiplexer 21, and a passive optical network (PON) having the structure described above is suitable for a plurality of subscribers in major cities. However, the PON having such a structure is not economical in areas outside the major cities, which have a smaller number of subscribers.

SUMMARY OF THE INVENTION

Accordingly, the present invention has been made to solve the above-mentioned problems occurring in the prior art and provides additional advantages, by providing a wavelength division multiplexed-passive optical network having an economical bus structure suitable for less populated areas.

According to one aspect of the present invention, a wavelength division multiplexed-passive optical network (WDM-PON) having a bus structure is provide and includes: a central office for downwardly transferring downstream optical signals having different wavelengths through a feeder fiber and for receiving upstream optical signals upwardly transferred through the feeder fiber; a plurality of remote nodes including at least a first remote node connected to the central office through the feeder fiber and a second remote node connected to the first remote node through the feeder fiber, for dropping optical signals having corresponding wavelengths from among downwardly-transferred optical signals from the central office to at least one subscriber unit connected to each of the remote nodes, and for adding the upstream optical signals, which are upwardly transferred from each subscriber unit, so as to upwardly transfer the upstream optical signals to the central office; and at least one subscriber unit for receiving the optical signals having the corresponding wavelengths dropped from each of the remote nodes and for upwardly transferring the upstream optical signals having different wavelengths through each of the remote nodes.

According another aspect of the present invention, the central office includes a plurality of downstream light sources for outputting the downstream optical signals having different wavelengths, a plurality of upstream optical receivers for receiving the upstream optical signals, and a first wavelength division multiplexer which multiplexes the downstream optical signals and demultiplexes the upstream optical signals.

The first wavelength division multiplexer includes an array waveguide grating (AWG).

Each of the remote nodes includes an add/drop multiplexer, which demultiplexes the multiplexed downstream optical signals transferred from the central office and multiplexes the upstream optical signals upwardly transferred from each subscriber unit, and a plurality of second wavelength division multiplexers which split the downstream optical signals and the upstream optical signals assigned to each subscriber unit.

The add/drop multiplexer includes a filter type wavelength division multiplexer.

Each subscriber unit includes a downstream optical receiver for receiving the downstream optical signals, which are downwardly transferred from each of the remote nodes, an upstream light source for outputting the upstream optical signals, and a third wavelength division multiplexer for splitting the upstream optical signals and the downstream optical signals.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
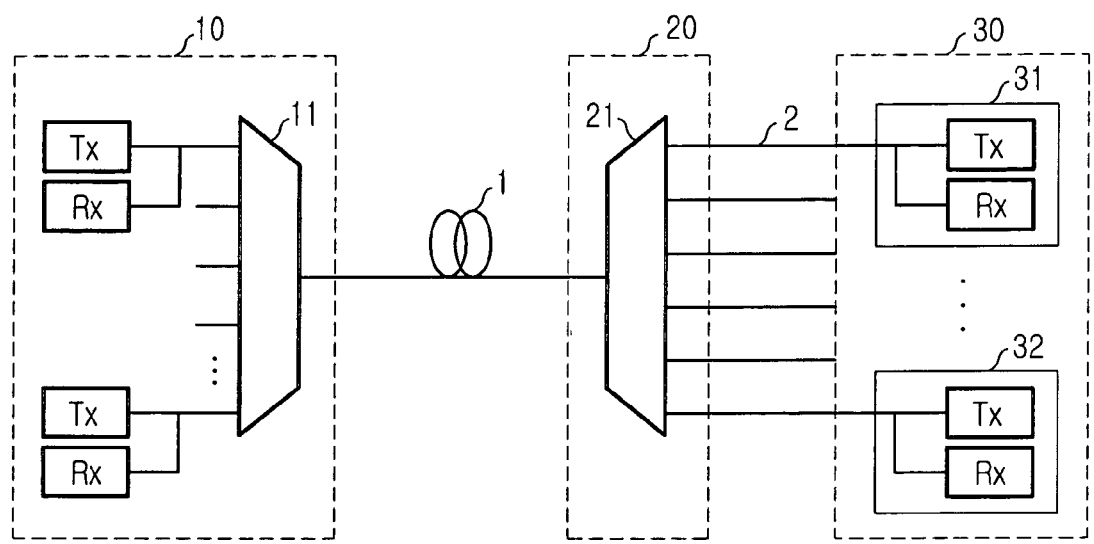
FIG. 1 is a diagram showing the structure of a conventional wavelength division multiplexed-passive optical network.

Hereinafter, an embodiment of the present invention will be described in detail with reference to the accompanying drawings. Note that the same or similar components in drawings are designated by the same reference numerals as far as possible although they are shown in different drawings. For the purposes of clarity and simplicity, a detailed description of known functions and configurations incorporated herein will be omitted as it may make the subject matter of the present invention unclear.

Figure 2:
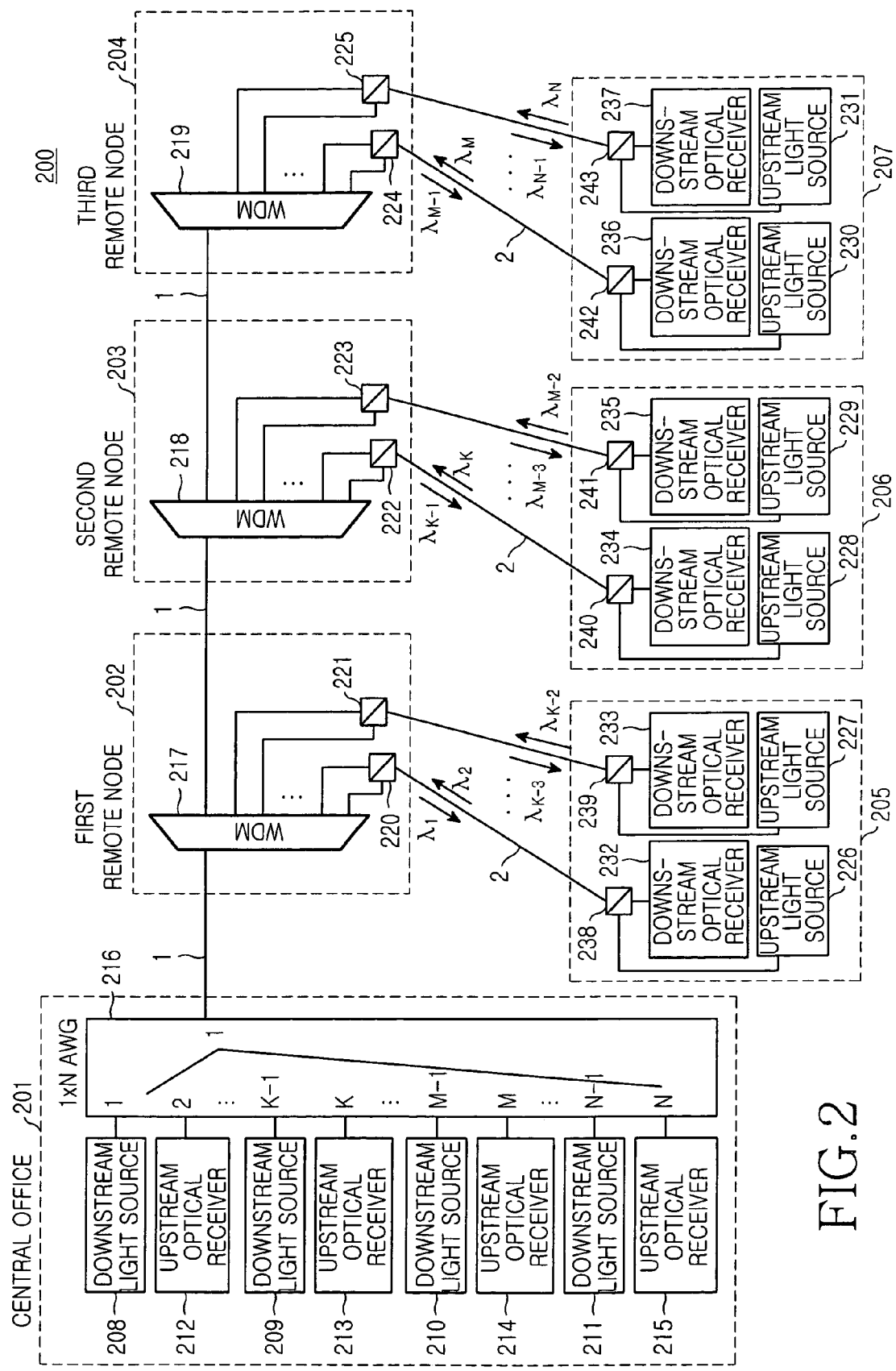
FIG. 2 is a diagram showing the structure of a wavelength division multiplexed-passive optical network having a bus structure according to one embodiment of the present invention.

FIG. 2 is a diagram showing the structure of a wavelength division multiplexed-passive optical network (WDM-PON) 200 having a bus structure according to one embodiment of the present invention.

As shown, the WDM-PON 200 having the bus structure includes a central office 201, a plurality of remote nodes 202 to 204 connected to the central office 201 through a feeder fiber 1 in series, and a plurality of subscriber units 205 to 207 connected to the remote nodes 202 to 204 through distribution fibers 2.

The central office 201 includes N/2 downstream light sources 208 to 211 which transmit downstream optical signals having different wavelengths, N/2 upstream optical receivers 212 to 215 which receive upstream optical signals having different wavelengths, and a 1×N array waveguide grating 216 which multiplexes the downstream optical signals and demultiplexes the upstream optical signals.

The three remote nodes 202 to 204 include add/drop multiplexers 217 to 219, which drop optical signals downwardly transferred from the central office 201 through the feeder fiber 1 and add optical signals upwardly transferred from subscriber units 205 to 207 (one subscriber unit is composed of one upstream light source, downstream optical receiver and add drop multiplxer) through the distribution optical fibers 2, and a maximum of N/2 wavelength division multiplexers 220 to 225 which split the upstream optical signals and the downstream signals. The add/drop multiplexers 217 to 219 are filter type wavelength division multiplexers and have filter characteristics, which are not varied by a temperature, so it is not necessary to control and inspect the temperature. These type of add/drop multiplexer are commercially available and well know in the art. See for example, Dense WDM module made by Korea Electric Terminal Co., Ltd., located in Republic of Korea.

The subscriber units 205 to 207 include upstream light sources 226 to 231 which transmit upstream optical signals having different wavelengths, downstream optical receivers 232 to 237 which receive downstream optical signals having different wavelengths, and wavelength division multiplexers 238 to 243 which split the upstream optical signals and the downstream optical signals.

It should be that although a limited number of remote nodes and subscribers units is shown in FIG. 2 for illustrative purposes, it is to be understood that the present invention can support communications between a much larger number of remote nodes and subscriber units. Thus, the number of remote nodes and subscriber units in the drawing should not impose limitations on the scope of the invention.

Now, an operation of the WDM-PON 200 of the bus structure having the structure described above will be described.

First, in case of downstream transmission of optical signals, N/2 downstream optical signals, which are delivered from the downstream light sources 208 to 211 positioned at the central office 201, are multiplexed by the 1×N array waveguide grating 216 and transferred to a first remote node 202, which is connected to a second remote node 203 through the feeder fiber 1 in the bus structure in series. First optical signals (a maximum value thereof is N/2) to be received by the first remote node 202 among the optical signals transferred from the central office 201 are dropped through a drop port of the add/drop multiplexer 217.

At the same time, remaining optical signals except for the first optical signals are sequentially transferred to the second remote node 203 and a third remote node 204, so that optical signals of corresponding remote nodes are dropped to the corresponding remote nodes. Optical signals dropped to the corresponding remote nodes 202 to 204 are downwardly transferred to the wavelength division multiplexers 238 to 243 of the subscriber units 205 to 207, which are connected to the wavelength division multiplexers 220 to 225 through the distribution fibers 2, so as to be received by the downstream optical receivers 232 to 237 for receiving optical signals having corresponding wavelengths.

In case of upstream transmission of optical signals, the upstream optical signals delivered from the upstream light sources 226 to 231 positioned at the subscriber units 205 to 207 are transferred to the wavelength division multiplexers 220 to 225 of the corresponding remote nodes 202 to 204 through the wavelength division multiplexers 238 to 243 of the subscriber units 205 to 207. After the transferred optical signals are added and multiplexed by the add/drop multiplexers 217 to 219, the transferred upstream optical signals are upwardly transferred to the central office 201 through the feeder fiber 1. After the upwardly transferred optical signals are demultiplexed by the 1×N array waveguide grating 216, the demultiplexed optical signals are received by the upstream optical receivers 212 to 215 of corresponding wavelengths.

Meanwhile, the total number of wavelengths added and dropped in the entire remote nodes 202 to 204 may be smaller than or equal to N. For example, when the number of wavelengths added and dropped in the entire remote nodes 202 to 204 is equal to N, a wavelength assignment is performed as following methods described with reference to FIGS. 3 and 4.

Figure 3:
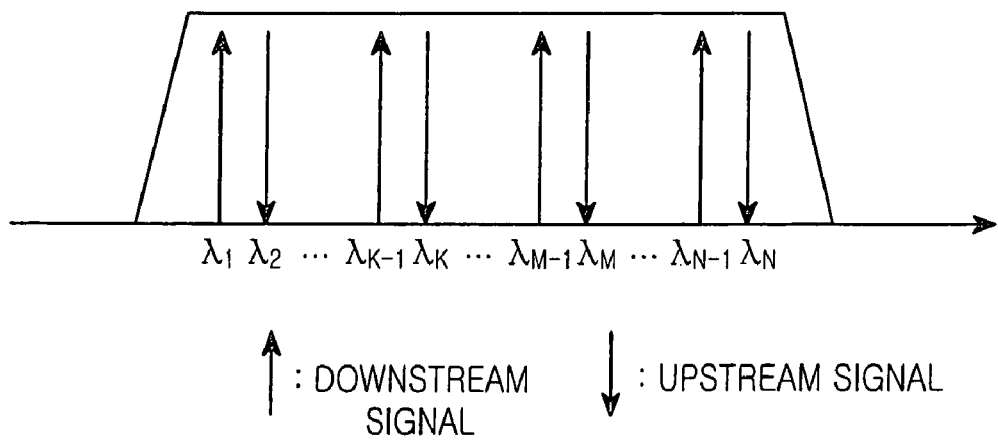
FIG. 3 is a graph showing an example of a wavelength assignment of a 1×N array waveguide grating positioned at a central office shown in FIG. 2.
Figure 4:
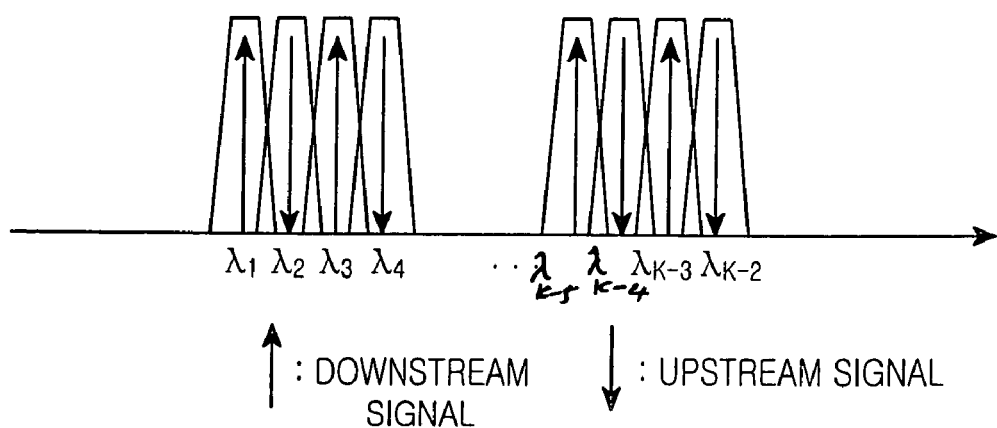
FIG. 4 is a graph showing an example of an assignment for wavelengths added/dropped by an optical add/drop multiplexer positioned at a first remote node shown in FIG. 2.

FIG. 3 is a graph showing an example of a wavelength assignment of the 1×N array waveguide grating 216 positioned at the central office 201. FIG. 4 is a graph showing an example of an assignment for wavelengths added and dropped by the optical add/drop multiplexer 217 positioned at the first remote node 202.

Referring to FIGS. 3 and 4, the central office 201 divides wavelengths such that downstream signals have wavelengths of $\lambda_1$, $\lambda_{k-1}$, $\lambda_{M-1}$, $\lambda_{N-1}$ and upstream signals have wavelengths of $\lambda_2$, $\lambda_k$, $\lambda_M$, $\lambda_N$ as shown in FIG. 3 and, if there are three remote nodes, for example, a first remote node can divide wavelengths corresponding to the first remote node such that downstream signals have wavelengths of $\lambda_1$, $\lambda_3$, . . . , $\lambda_{k-3}$ and the upstream signals have wavelengths of $\lambda_2$, $\lambda_4$, . . . , $\lambda_{k-2}$ as shown in FIG. 4. Similarly, a second remote node can divide wavelengths corresponding to the second remote node such that downstream signals have wavelengths of $\lambda_{k-1}$, $\lambda_{k+1}$, . . . , $\lambda_{M-3}$ and upstream signals have wavelengths of $\lambda_K$, $\lambda_{K+2}$, . . . , $\lambda_{M-2}$. Further, a third remote node can divide wavelengths corresponding to the third remote node such that downstream signals have wavelengths of $\lambda_{M-1}$, $\lambda_{M+1}$, . . . , $\lambda_{N-1}$ and upstream signals have wavelengths of $\lambda_M$, $\lambda_{M+2}$, . . . , $\lambda_N$. Note that the methods of performing a wavelength assignment are not limited to the example described above. If there are L wavelengths added/dropped by an add/drop multiplexer used in each remote node, a half of the L wavelengths can be used for upstream signals and the remaining of the L wavelengths can be used for downstream signals.

As described above, in the WDM-PON having the bus structure according to the present invention, one central office can employ a plurality remote nodes having economical add/drop multiplexers. In addition, since bi-directional transmission for the upstream and the downstream signals are carried out through one strand of an optical fiber, efficiency of an optical fiber increases. Furthermore, since filter characteristics are not varied by a temperature in an add/drop multiplexer used for a remote node, it is not necessary to control and inspect the temperature. Therefore, the WDM-PON having the bus structure according to the present invention is suitable for areas outside of major cities with a minimal cost.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A wavelength division multiplexed-passive optical network (WDM-PON) having a bus structure, comprising:
   a central office for exchanging downstream/upstream optical signals having different wavelengths through a feeder fiber, the central office having a first wave division multiplexer (WDM) for multiplexing the downstream optical signals and demultiplexing the upstream optical signals;
   a plurality of remote nodes coupled to the central office in sequence through the feeder fiber, each remote node including an add/drop multiplexer for dropping optical signals having corresponding wavelengths from the central office, and at least one secondary wave division multiplexer (WDM) for splitting the downstream/upstream optical signals to at least one subscriber unit coupled to each of the remote nodes and transferring the upstream optical signals from each subscriber unit to the central office; and
   at least one subscriber unit including at least one third wave division multiplexer (WDM) for receiving the optical signals having corresponding wavelengths from each of the remote nodes and for transferring the upstream optical signals having different wavelengths through each of the remote nodes.

2. The wavelength division multiplexed-passive optical network as claimed in claim 1, wherein the central office includes a plurality of downstream light sources for outputting the downstream optical signals having different wavelengths, a plurality of upstream optical receivers for receiving the upstream optical signals.

3. The wavelength division multiplexed-passive optical network as claimed in claim 1, wherein the first wavelength division multiplexer includes an array waveguide grating (AWG).

4. The wavelength division multiplexed-passive optical network as claimed in claim 1, wherein the add/drop multiplexer includes a filter type wavelength division multiplexer.

5. The wavelength division multiplexed-passive optical network as claimed in claim 1, wherein the add/drop multiplexer includes an array waveguide grating.

6. The wavelength division multiplexed-passive optical network as claimed in claim 1, wherein each subscriber unit includes a downstream optical receiver for receiving the downstream optical signals transferred from each of the remote nodes, an upstream light source for outputting the upstream optical signals.

* * * * *